United States Patent
Albu et al.

(10) Patent No.: US 6,738,178 B2
(45) Date of Patent: May 18, 2004

(54) ELECTRICALLY CONFIGURABLE PHOTONIC CRYSTAL

(75) Inventors: Lucian R. Albu, New York, NY (US); Peter J. Janssen, Scarborough, NY (US); Willem G. Odendaal, Blacksburg, VA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 146 days.

(21) Appl. No.: 10/183,803

(22) Filed: Jun. 27, 2002

(65) Prior Publication Data

US 2004/0001246 A1 Jan. 1, 2004

(51) Int. Cl.[7] .............................. G02F 1/00; G02F 1/03; G02F 1/29; G02F 1/1335; G09G 3/36
(52) U.S. Cl. .................. 359/321; 359/245; 359/253; 359/254; 359/316; 349/71; 349/106; 345/104; 345/182; 257/59
(58) Field of Search ................. 359/245, 251, 359/252, 253, 254, 238, 248, 250, 321, 322, 316; 345/104, 182; 349/12, 71, 106, 158; 257/59, 258

(56) References Cited

U.S. PATENT DOCUMENTS

| | | | |
|---|---|---|---|
| 4,678,285 A | * 7/1987 | Ohta et al. | 349/71 |
| 4,793,691 A | * 12/1988 | Enomoto et al. | 349/71 |
| 4,909,626 A | 3/1990 | Purvis et al. | 356/332 |
| 5,430,462 A | * 7/1995 | Katagiri et al. | 345/104 |
| 5,780,871 A | * 7/1998 | den Boer et al. | 257/59 |
| 5,787,461 A | 7/1998 | Stephens | 711/113 |
| 5,955,749 A | 9/1999 | Joannopoulos et al. | 257/98 |
| 5,973,823 A | 10/1999 | Koops et al. | 359/322 |
| 6,064,506 A | 5/2000 | Koops | 359/237 |

FOREIGN PATENT DOCUMENTS

FR        2 814 281 A1   *   3/2002

OTHER PUBLICATIONS

Abstract entitled "*Electrically Configurable Photonic Crystal*", Dated Nov. 5, 2001, Applicant is Remus Albu, Pete Janssen, Adrian Ryan, Philips Research—USA, pp. 1–22.
Patents Abstracts of Japan, vol. 2002, No. 07, Jul. 3, 2002, JP 2002 090724.

* cited by examiner

Primary Examiner—Loha Ben

(57) ABSTRACT

A liquid crystal is configured as a photonic crystal by an establishment of a network of biased liquid crystal regions within the liquid crystal. The liquid crystal is situated between a dielectric plane including an electrode plate and a glass plate, and a dielectric plane including a glass plate and a plurality of electrode pixels. The network is established by a selective application of one or more electric potentials between an electrode plate and one or more of the electrode pixels.

12 Claims, 8 Drawing Sheets

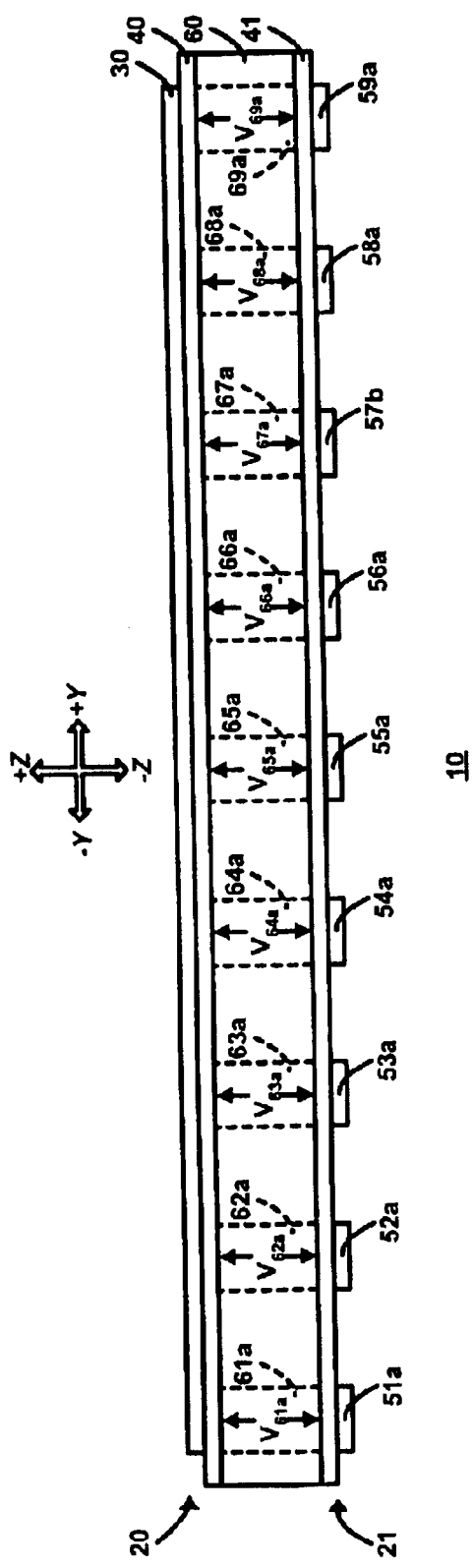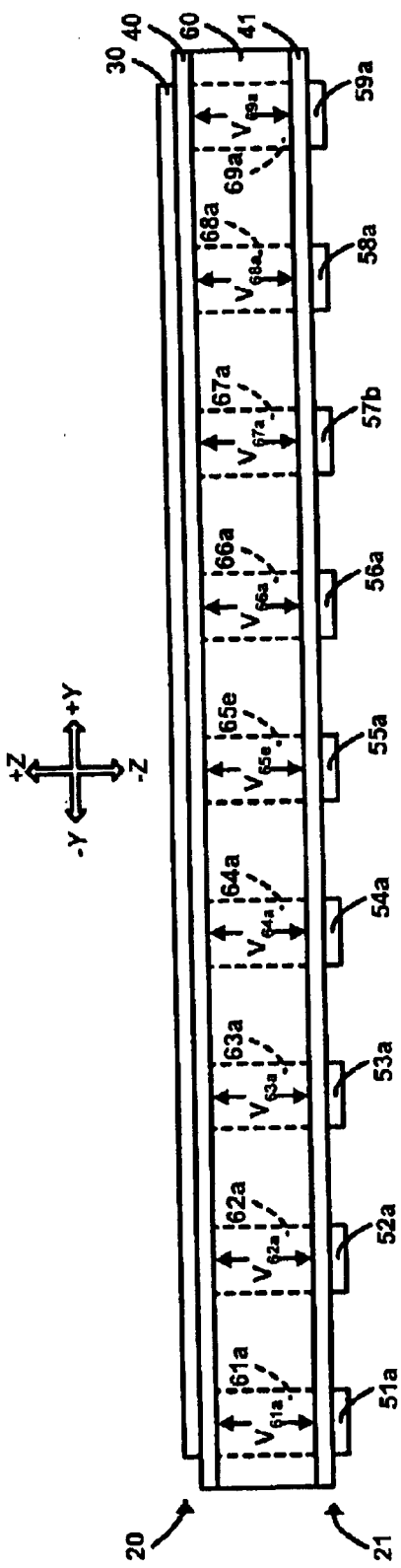

ELECTRICALLY CONFIGURABLE PHOTONIC CRYSTAL

TECHNICAL FIELD OF THE INVENTION

The present invention generally relates to various devices employing photonic crystals. The present invention specifically relates to a control of electromagnetic waves interaction with a medium employing liquid crystal.

BACKGROUND AND SUMMARY OF THE INVENTION

Photonic crystals as known in the art are defined as a space domain, which confines a repetitive spatial distribution of dielectric or magnetic material properties. Photon energy distribution delimited within a photonic crystal depicts "energy bands" having shapes that characterize propagation modes for selectively reflecting, transmitting and absorbing a propagation of energy in the form of light or electromagnetic waves through the photonic crystal. The shape of the energy bands are a function of the repetitive spatial dielectric distribution of the photonic crystal. Accordingly, a variation in the repetitive spatial dielectric distribution varies the shapes of the energy band gaps to thereby establish a different propagation mode of the photonic crystal.

The present invention is a photonic crystal being electrically configurable among a plurality of propagation modes. Various aspects of the present invention are novel, non-obvious, and provide various advantages. While the actual nature of the present invention covered herein can only be determined with reference to the claims appended hereto, certain features, which are characteristic of the embodiments disclosed herein, are described briefly as follows.

An electrical configurable photonic crystal in accordance with the present invention comprises a liquid crystal, an electrode plate and a plurality of electrode pixels. In one form, the electrode plate and the electrode pixels are operable to configure the liquid crystal as a photonic crystal in response to a selective application of one or more electric potentials between the electrode plate and one or more electrode pixels. In a second form, an electrical interaction between the electrode plate and one or more of the electrode pixels establishes one or more biased liquid crystal regions with the liquid crystal. In a third form, the electrode plate and a first electrode pixel are operable to establish a biased liquid crystal region within the liquid crystal in response to an application of a first electric potential between the electrode plate and the first electrode pixel.

The foregoing forms as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 4 illustrates a side view of a first configuration of the FIG. 1 electromagnetic waves interaction device into an electrically configurable photonic crystal in accordance with the present invention;

FIG. 7 illustrates a side view of a second configuration of the FIG. 1 electromagnetic waves interaction device into an electrically configurable photonic crystal in accordance with the present invention;

DETAILED DESCRIPTION OF THE PRESENT INVENTION

Figure 1:
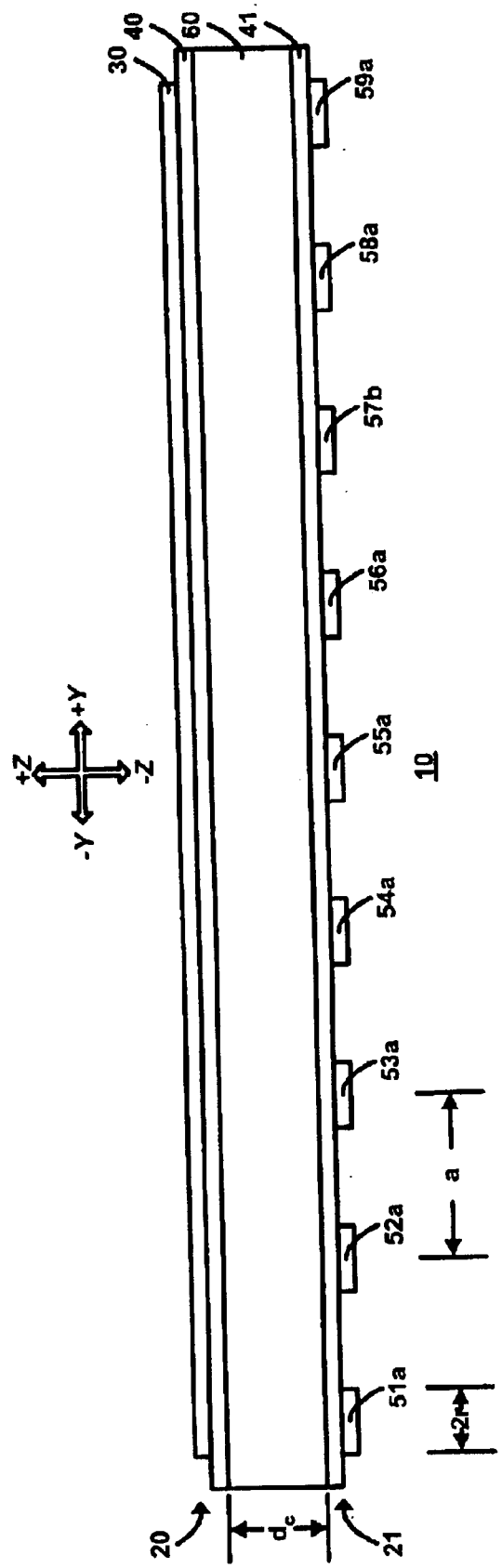
FIG. 1 illustrates a side view of one embodiment of an electromagnetic waves interaction device in accordance with the present invention.
Figure 2:
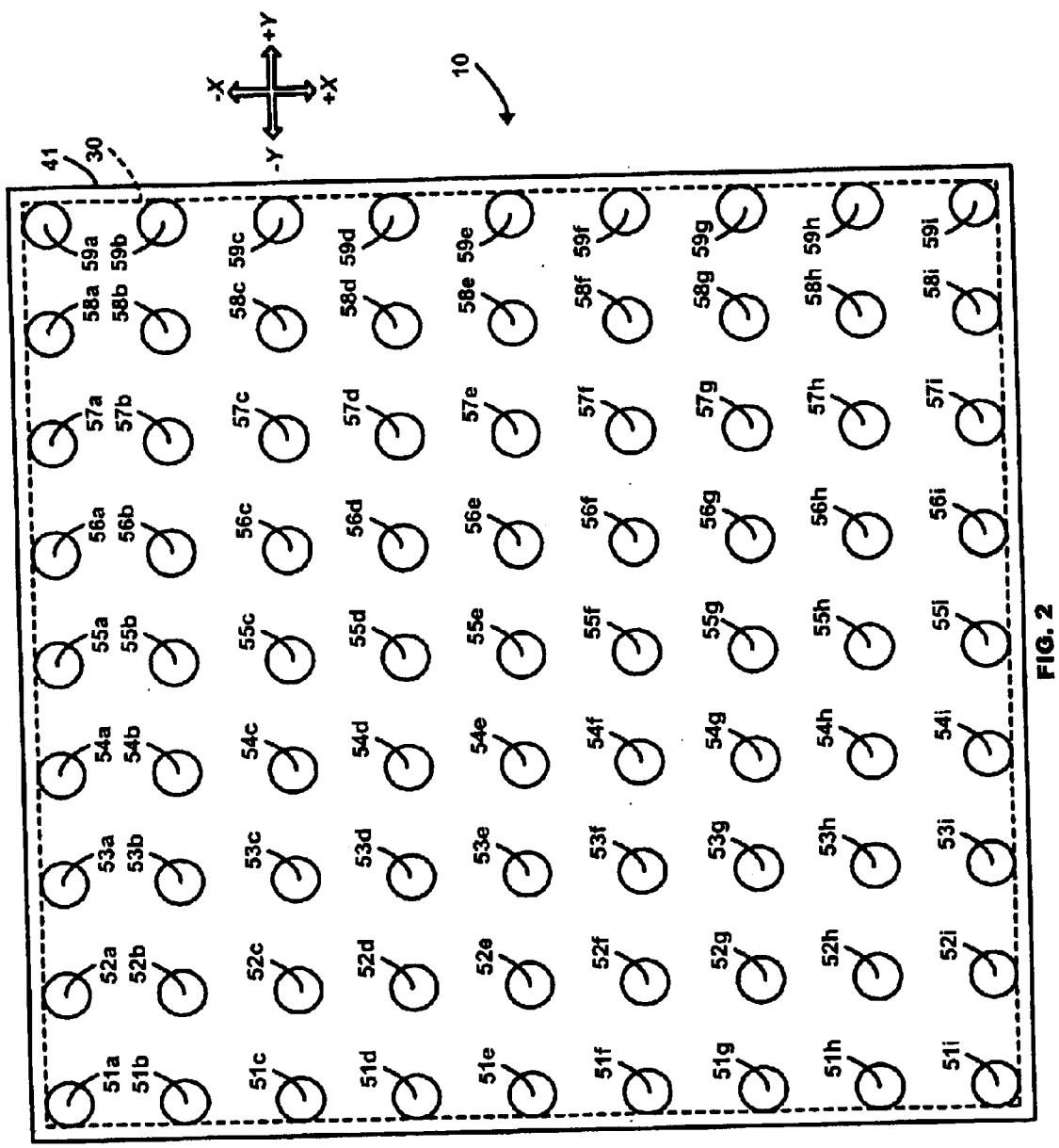
FIG. 2 illustrates a bottom view of the FIG. 1 electromagnetic waves interaction device.
Figure 3:
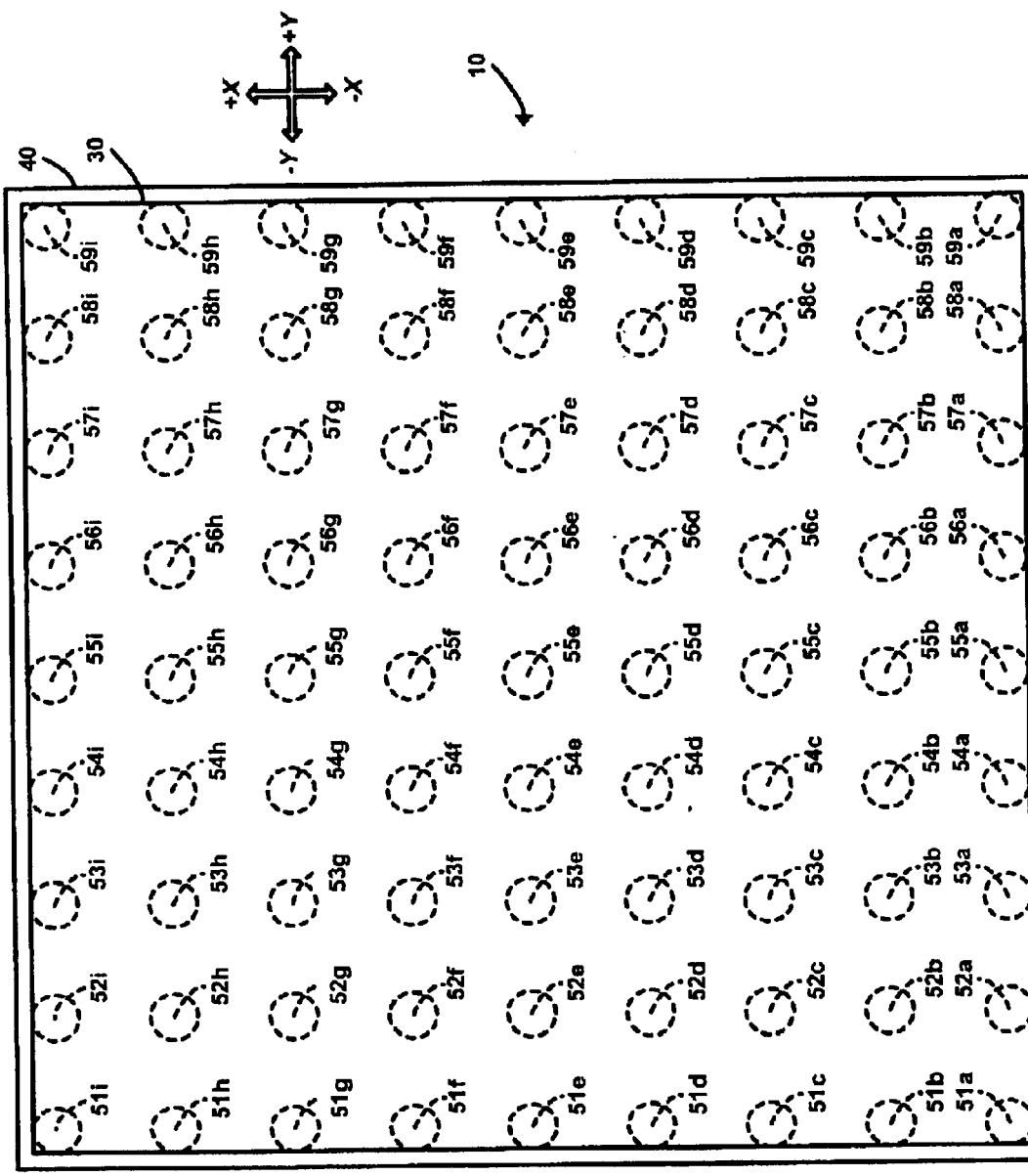
FIG. 3 illustrates a top view of the FIG. 1 electromagnetic waves interaction device.

FIGS. 1–3 illustrate an electromagnetic waves interaction device 10 of the present invention. A Cartesian system is included within FIGS. 1–3 to facilitate a description of the electromagnetic waves interaction device 10 and is therefore not a limitation as to the scope of the electromagnetic waves interaction device 10 in accordance with the present invention.

The electromagnetic waves interaction device 10 has a first dielectric plane 20 and a second dielectric plane 21. The first dielectric plane 20 is defined by an electrode plate 30 (e.g., Aluminum) and a glass plate 40 (e.g., silicon dioxide). The second dielectric plane 21 is defined by a glass plate 41 (e.g., silicon dioxide), and a 9×9 square matrix of electrode pixels 51a–59i (e.g., Aluminum). The electromagnetic waves interaction device 10 further includes a liquid crystal 60 situated between the dielectric planes 20 and 21. The electromagnetic waves interaction device 10 can be conventionally fabricated as will be appreciated by those having ordinary skill in the art.

In one embodiment, a distance $d_c$ between the dielectric planes 20 and 21 is 0.7 $\mu$m while a dielectric thickness of the electrode plate 30, the glass plates 40 and 41, and the electrode pixels 51a–59i is 0.15 $\mu$m. Also, each electrode pixel 51a–59i has a radius r 0.15 $\mu$m, and a distance between the centers of adjacent pixels 51a–59i is 1.5 $\mu$m. The illustrations of the electromagnetic waves interaction device 10 in FIGS. 1–3 are roughly drawn to scale to reflect the aforementioned dimensions.

Alternative embodiments of the electromagnetic waves interaction device 10 can employ more or less electrode pixels and/or employ a different arrangement of the electrode pixels within the dielectric plane 21 (e.g., a hexagonal elementary cell, a rectangular elementary cell, a rhomboidal elementary cell, etc.). Additionally, alternative embodiments of the electromagnetic waves interaction device 10 can employ more electrode plates 30. Those having ordinary skill in the art will therefore appreciate the number of structural embodiments of the dielectric planes of the electromagnetic waves interaction device 10 in accordance with the present invention are essentially limitless.

Functional Description of the Present Invention

Referring still to FIGS. 1–3, the liquid crystal 60 can be configured into a photonic crystal that can be operated for selectively reflecting, transmitting and absorbing a propagation of electromagnetic waves received by the liquid crystal 60 in either a ±X and/or ±Y direction, such for, for example electromagnetic ("EM") waves in the form of light or electromagnetic waves, respectively. The configuration of the liquid crystal 60 into a photonic crystal is based upon an electrical interaction between the electrode plate 30 and one or more of the electrode pixels $51a$–$59i$ in the form a selective application of electric potential between the electrode plate 30 and each electrode pixel $51a$–$59i$. The following TABLE 1 lists electric potentials in voltage form as related to a corresponding electrode pixel $51a$–$59i$:

TABLE 1

| | | | | | | | | |
|---|---|---|---|---|---|---|---|---|
| $V_{51a}$ | $V_{51b}$ | $V_{51c}$ | $V_{51d}$ | $V_{51e}$ | $V_{51f}$ | $V_{51g}$ | $V_{51h}$ | $V_{51i}$ |
| $V_{52a}$ | $V_{52b}$ | $V_{52c}$ | $V_{52d}$ | $V_{52e}$ | $V_{52f}$ | $V_{52g}$ | $V_{52h}$ | $V_{52i}$ |
| $V_{53a}$ | $V_{53b}$ | $V_{53c}$ | $V_{53d}$ | $V_{53e}$ | $V_{53f}$ | $V_{53g}$ | $V_{53h}$ | $V_{53i}$ |
| $V_{54a}$ | $V_{54b}$ | $V_{54c}$ | $V_{54d}$ | $V_{54e}$ | $V_{54f}$ | $V_{54g}$ | $V_{54h}$ | $V_{54i}$ |
| $V_{55a}$ | $V_{55b}$ | $V_{55c}$ | $V_{55d}$ | $V_{55e}$ | $V_{55f}$ | $V_{55g}$ | $V_{55h}$ | $V_{55i}$ |
| $V_{56a}$ | $V_{56b}$ | $V_{56c}$ | $V_{56d}$ | $V_{56e}$ | $V_{56f}$ | $V_{56g}$ | $V_{56h}$ | $V_{56i}$ |
| $V_{57a}$ | $V_{57b}$ | $V_{57c}$ | $V_{57d}$ | $V_{57e}$ | $V_{57f}$ | $V_{57g}$ | $V_{57h}$ | $V_{57i}$ |
| $V_{58a}$ | $V_{58b}$ | $V_{58c}$ | $V_{58d}$ | $V_{58e}$ | $V_{58f}$ | $V_{58g}$ | $V_{58h}$ | $V_{58i}$ |
| $V_{59a}$ | $V_{59b}$ | $V_{59c}$ | $V_{59d}$ | $V_{59e}$ | $V_{59f}$ | $V_{59g}$ | $V_{59h}$ | $V_{59i}$ |

Figure 5:
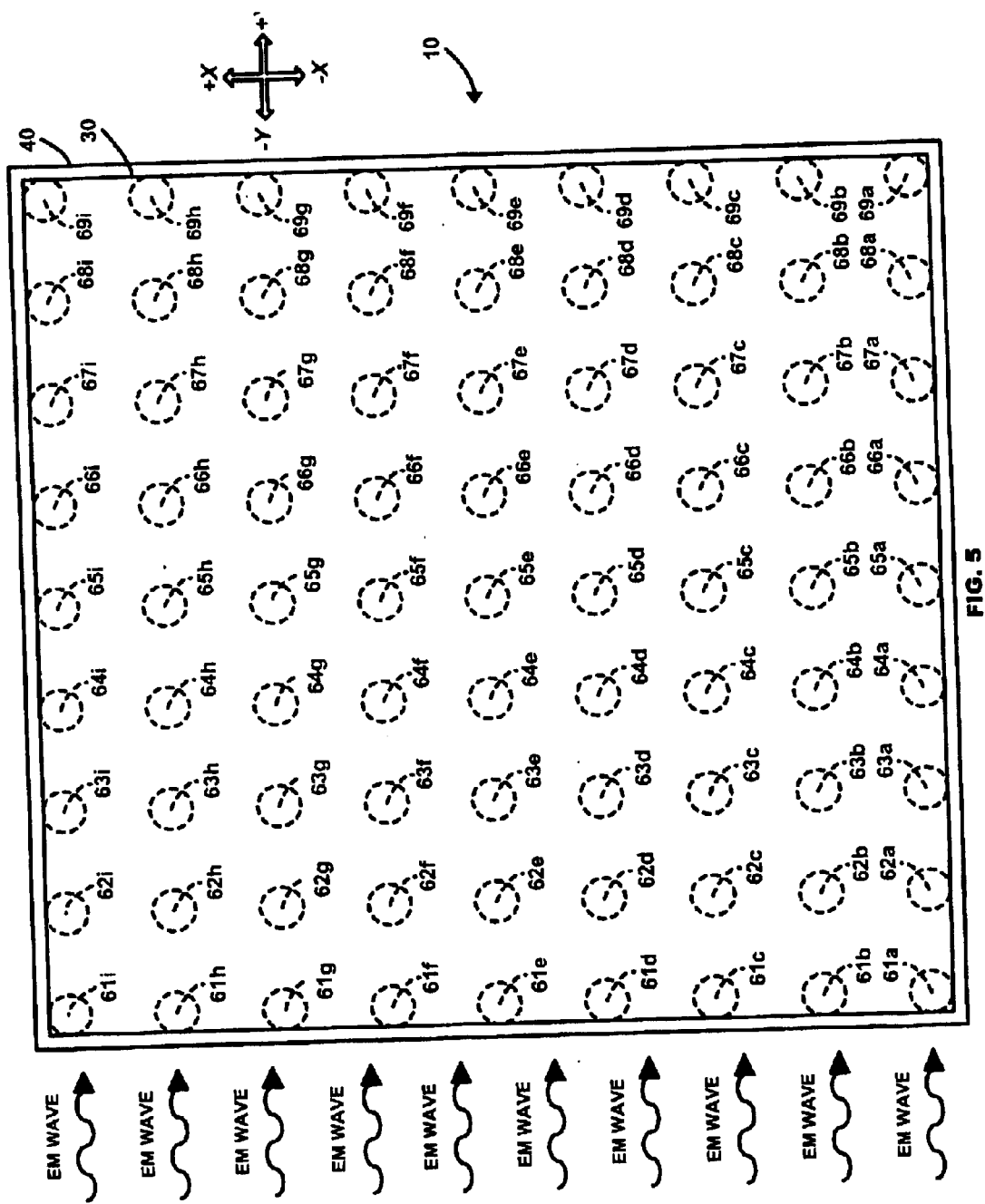
FIG. 5 illustrates a top view of the FIG. 4 electrically configurable photonic crystal.

FIGS. 4 and 5 illustrate an exemplary configuration of the liquid crystal 60 (FIGS. 1–3) into a photonic crystal by an application of each of the electric potentials listed in TABLE 1 between the electrode plate 30 and a respective electrode pixel, where each electric potential $V_{51a}$–$V_{59i}$ can have the same magnitude, different magnitudes, or grouped into a cell (i.e., a subset of the electric potential $V_{51a}$–$V_{59i}$ of the same magnitude). The generation of the electric potentials $V_{51a}$–$V_{59i}$ results in the formation of a network of biased liquid crystal regions $61a$–$69i$ for selectively reflecting, transmitting, and absorbing an electromagnetic energy flux in the form of light or an electromagnetic wave in either ±X and/or ±Y direction, such for, for example, the EM waves illustrated in FIG. 5. The operation of the network of biased liquid crystal regions $61a$–$69i$ in selectively reflecting, transmitting, and absorbing the electromagnetic energy flux is based on a repetitive dielectric constant distribution of the liquid crystal 60 established by the network.

Figure 6:
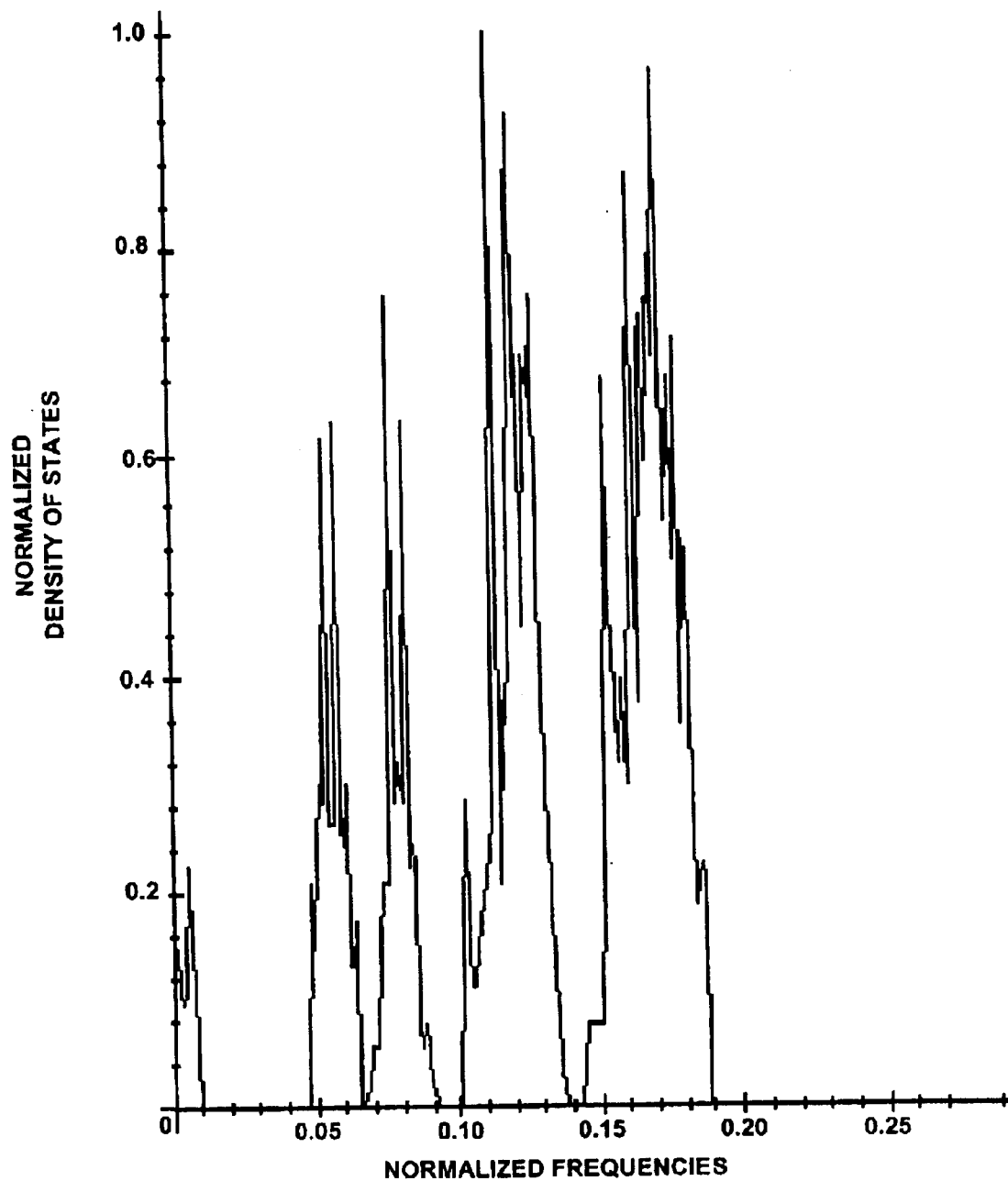
FIG. 6 illustrates an exemplary graphical representation of a normalized electromagnetic energy density of states vs. normalized frequency distribution for the FIG. 4 electrically configurable photonic crystal.

FIG. 6 illustrates an exemplary graphical representation of a normalized electromagnetic energy density of states vs. normalized frequency distribution for the photonic crystal 11. The bandwidths of the various energy band (i.e., a frequency range when the density of state equals zero) is a function of the magnitude of the dielectric constant distribution of the liquid crystal 60 established by the network, which is a function of the voltage level of the various electric potentials $V_{51a}$–$V_{59i}$.

Figure 8:
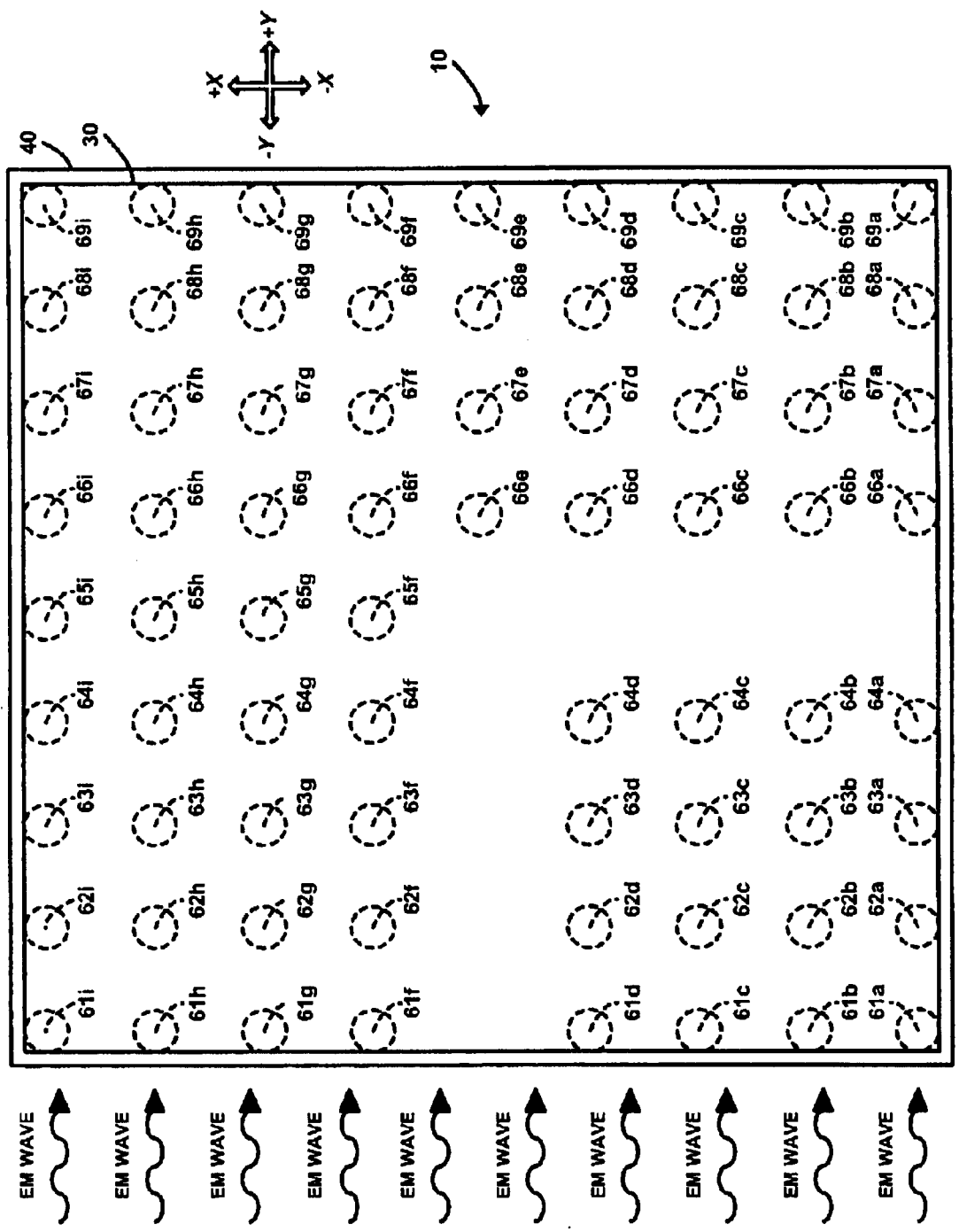
FIG. 8 illustrates a top view of the FIG. 7 electrically configurable photonic crystal.

FIGS. 7 and 8 illustrate another exemplary configuration of the liquid crystal 60 (FIGS. 1–3) into a photonic crystal by an application of each of the electric potentials listed in the following TABLE 2 between the electrode plate 30 and a respective electrode pixel.

TABLE 2

| | | | | | | | | |
|---|---|---|---|---|---|---|---|---|
| $V_{51a}$ | $V_{51b}$ | $V_{51c}$ | $V_{51d}$ | $V_{51e}$ | $V_{51f}$ | $V_{51g}$ | $V_{51h}$ | $V_{51i}$ |
| $V_{52a}$ | $V_{52b}$ | $V_{52c}$ | $V_{52d}$ | $V_{52e}$ | $V_{52f}$ | $V_{52g}$ | $V_{52h}$ | $V_{52i}$ |
| $V_{53a}$ | $V_{53b}$ | $V_{53c}$ | $V_{53d}$ | $V_{53e}$ | $V_{53f}$ | $V_{53g}$ | $V_{53h}$ | $V_{53i}$ |
| $V_{54a}$ | $V_{54b}$ | $V_{54c}$ | $V_{54d}$ | $V_{54e}$ | $V_{54f}$ | $V_{54g}$ | $V_{54h}$ | $V_{54i}$ |
| | | | | | $V_{55f}$ | $V_{55g}$ | $V_{55h}$ | $V_{55i}$ |
| $V_{56a}$ | $V_{56b}$ | $V_{56c}$ | $V_{56d}$ | | $V_{56f}$ | $V_{56g}$ | $V_{56h}$ | $V_{56i}$ |
| $V_{57a}$ | $V_{57b}$ | $V_{57c}$ | $V_{57d}$ | | $V_{57f}$ | $V_{57g}$ | $V_{57h}$ | $V_{57i}$ |
| $V_{58a}$ | $V_{58b}$ | $V_{58c}$ | $V_{58d}$ | | $V_{58f}$ | $V_{58g}$ | $V_{58h}$ | $V_{58i}$ |
| $V_{59a}$ | $V_{59b}$ | $V_{59c}$ | $V_{59d}$ | | $V_{59f}$ | $V_{59g}$ | $V_{59h}$ | $V_{59i}$ |

Again, electric potential $V_{51a}$–$V_{54i}$, $V_{55f}$–$V_{56d}$, $V_{56f}$–$V_{57d}$, $V_{57f}$–$V_{58d}$, $V_{58f}$–$V_{59d}$, and $V_{59f}$–$V_{59i}$ can have the same magnitude, different magnitudes, or grouped into a cell (i.e., a subset of the electric potential $V_{51a}$–$V_{59i}$ of the same magnitude).

The application of the electric potentials listed in TABLE 2 results in the formation of a defective network of biased liquid crystal regions $61a$–$64i$, $65f$–$66d$, $66f$–$67d$, $67f$–$68d$, $69f$–$69d$, and $69f$–$69i$. The defective network selectively reflects, transmits, and absorbs an electromagnetic energy flux in the form of light or an electromagnetic wave in either ±X and/or ±Y direction, such for, for example, the EM waves illustrated in FIG. 8. The operation of the defective network in selectively reflecting, transmitting, and absorbing the electromagnetic energy flux is based on a non-uniform spatial dielectric distribution of the liquid crystal 60 established by the defective network.

Figure 9:
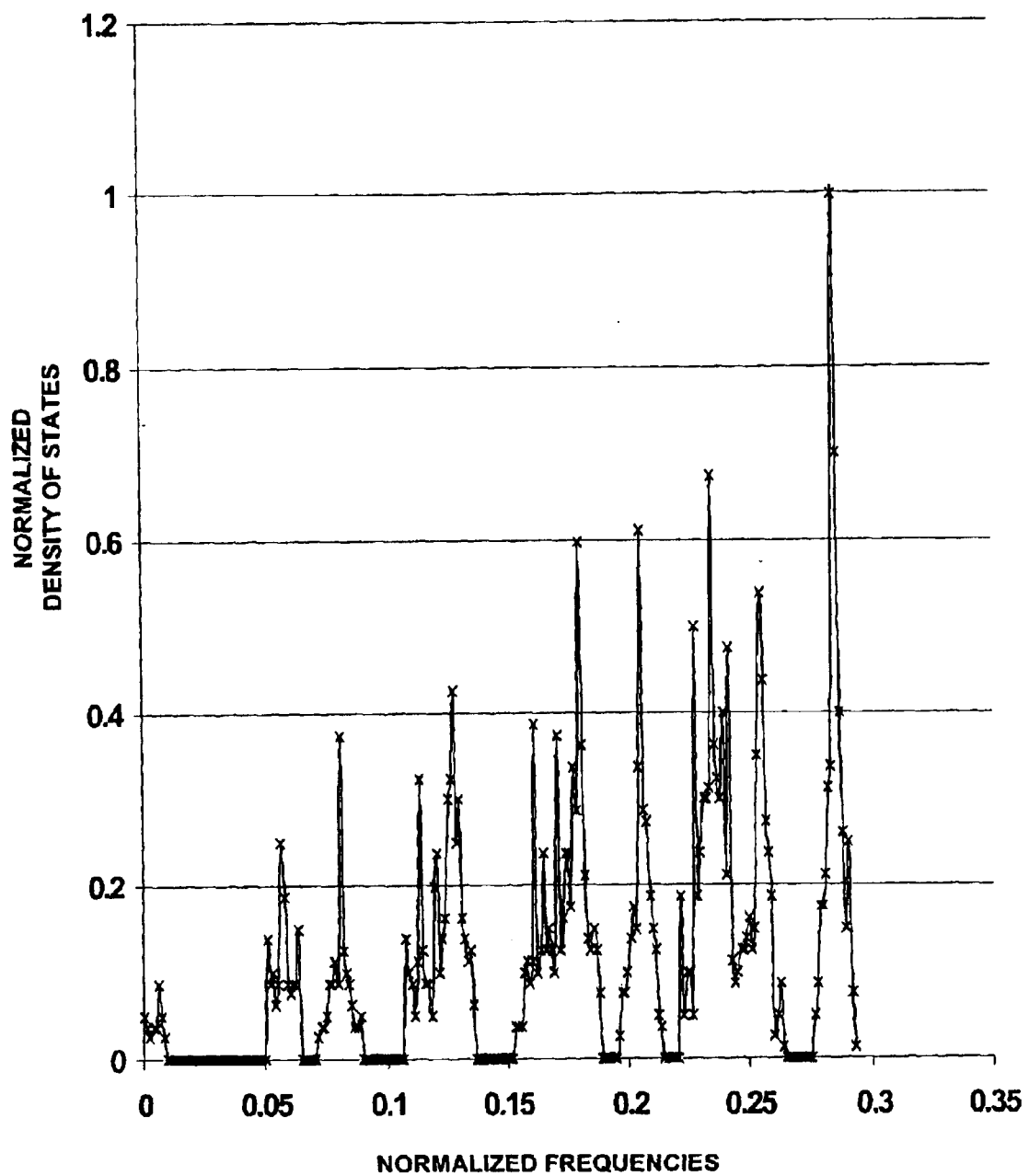
FIG. 9 illustrates an exemplary graphical representation of a normalized electromagnetic energy density of states vs. normalized frequency distribution for the FIG. 7 electrically configurable photonic crystal.

FIG. 9 illustrates an exemplary graphical representation of a normalized electromagnetic energy density of states vs. normalized frequency distribution for the photonic crystal 12. The bandwidths of the various energy bands (i.e., a frequency range when the density of state equals zero) is a function of the magnitude of the dielectric constant distribution of the liquid crystal 60 established by the network, which is a function of the voltage levels of the various electric potentials listed in TABLE 2.

From the preceding descriptions of an exemplary configuration of the liquid crystal 60 into a photonic crystal, one skilled in the art will appreciate various benefits and advantages of an electromagnetic waves interaction device in accordance with the present invention. A first advantage is the number of configurations of the liquid crystal 60 into a photonic crystal is proportional to an established magnitude range of the various electric potentials being applied between the electrode plate 30 and one or more of electrode pixels $51a$–$59i$. Accordingly, the number of configurations of the liquid crystal 60 into a photonic crystal increases as the magnitude range of electric potentials is increased, and vice-versa.

A second advantage is a tuning of the bandwidths of the energy bands of the liquid crystal 60 when operating as a photonic crystal by a selective modification of a local contrast ratio corresponding to the established network of biased liquid crystal regions. The tuning can be accomplished by an increase and/or a decrease in the magnitude of the electric potential(s) between the electrode plate 30 and the electrode pixels $51a$–$59i$ that are establishing the network. Alternatively or concurrently, the tuning can be accomplished by an increase or a decrease in the number of established biased liquid crystal regions with an application of more or less electric potentials between the electrode plate and the electrode pixels $51a$–$59i$, which will alter the spatial dielectric distribution of the liquid crystal 60.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. An electromagnetic waves interaction device, comprising:
    a liquid crystal;
    an electrode plate; and
    a plurality of electrode pixels,
    wherein said electrode plate and said plurality of electrode pixels are operable to configure the liquid crystal as a photonic crystal in response to a selective application of one or more electric potentials between said electrode plate and one or more of the electrode pixels.

2. The electromagnetic waves interaction device of claim 1,
    wherein said electrode plate defines a first dielectric plane;
    wherein said plurality of electrode pixels define a second dielectric plane; and
    wherein said liquid crystal is situated between the first dielectric plane and the second dielectric plane.

3. The electromagnetic waves interaction device of claim 2, further comprising:
    a glass plate, wherein said glass plate and said electrode plate collectively define the first dielectric plane.

4. The electromagnetic waves interaction device of claim 2, further comprising:
    a glass plate, wherein said glass plate and said plurality of electrode pixels collectively define the second dielectric plane.

5. An electromagnetic waves interaction device, comprising:
    a liquid crystal;
    an electrode plate; and
    a plurality of electrode pixels,
    wherein an electrical interaction between said electrode plate and one or more of said plurality of electrode pixels operates to establish a network of biased liquid crystal regions within said liquid crystal.

6. The electromagnetic waves interaction device of claim 5,
    wherein said electrode plate defines a first dielectric plane;
    wherein said plurality of electrode pixels define a second dielectric plane; and
    wherein said liquid crystal is situated between the first dielectric plane and the second dielectric plane.

7. The electromagnetic waves interaction device of claim 6, further comprising:
    a glass plate, wherein said glass plate and said electrode plate collectively define the first dielectric plane.

8. The electromagnetic waves interaction device of claim 6, further comprising:
    a glass plate, wherein said glass plate and said plurality of electrode pixels collectively define the second dielectric plane.

9. An electromagnetic waves interaction device, comprising:
    a liquid crystal;
    an electrode plate; and
    a plurality of electrode pixels,
    wherein said electrode plate and a first electrode pixel are operable to establish a first biased liquid crystal region within said liquid crystal in response to an application of a first electric potential between said electrode plate and said first electrode pixel.

10. The electromagnetic waves interaction device of claim 9,
    wherein said electrode plate defines a first dielectric plane;
    wherein said plurality of electrode pixels define a second dielectric plane; and
    wherein said liquid crystal is situated between the first dielectric plane and the second dielectric plane.

11. The electromagnetic waves interaction device of claim 10, further comprising:
    a glass plate, wherein said glass plate and said electrode plate collectively define the first dielectric plane.

12. The electromagnetic waves interaction device of claim 11, further comprising:
    a glass plate, wherein said glass plate and said plurality of electrode pixels collectively define the second dielectric plane.

* * * * *